United States Patent
Vivanco et al.

(10) Patent No.: US 8,942,704 B1
(45) Date of Patent: Jan. 27, 2015

(54) SYSTEMS AND METHODS OF TRACKING AREA CONFIGURATION

(71) Applicant: Sprint Spectrum LP, Overland Park, KS (US)

(72) Inventors: Daniel Vivanco, Sterling, VA (US); Krishna Sitaram, Chantilly, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 207 days.

(21) Appl. No.: 13/715,861

(22) Filed: Dec. 14, 2012

(51) Int. Cl.
  *H04W 36/00* (2009.01)
  *H04W 24/00* (2009.01)
  *H04W 72/00* (2009.01)
  *H04W 88/08* (2009.01)

(52) U.S. Cl.
  CPC ..................................... *H04W 88/08* (2013.01)
  USPC ......... 455/436; 455/446; 455/453; 455/456.1

(58) Field of Classification Search
  None
  See application file for complete search history.

(56) References Cited

U.S. PATENT DOCUMENTS

| | | | |
|---|---|---|---|
| 8,700,059 B1 * | 4/2014 | Vivanco et al. | 455/456.1 |
| 8,804,566 B1 * | 8/2014 | Singh et al. | 370/252 |
| 2008/0220782 A1 | 9/2008 | Wang et al. | |
| 2010/0120448 A1 * | 5/2010 | Iwamura et al. | 455/456.1 |
| 2011/0096731 A1 | 4/2011 | Kamalaraj et al. | |
| 2012/0014332 A1 | 1/2012 | Smith et al. | |

* cited by examiner

*Primary Examiner* — Erika A Washington

(57) ABSTRACT

In systems and methods of tracking area configuration, a number of tracking area update messages received by a plurality of access nodes using a first tracking area configuration are monitored. It is determined that a number of tracking area update messages received by one of the plurality of access nodes meets an update message criteria. It is also determined that a number of connected wireless devices at the one of the plurality of access nodes meets a connection criteria. When the number of tracking area update messages meets the update message criteria and when the number of connected wireless devices meets the connection criteria, the second tracking area configuration is used at the access node.

20 Claims, 6 Drawing Sheets

SYSTEMS AND METHODS OF TRACKING AREA CONFIGURATION

TECHNICAL BACKGROUND

A location of a wireless device can be tracked by a communication system on the basis of a tracking area. A tracking area is a group of access nodes, and is typically identified by a tracking area code or similar identifier. A communication system can store a tracking area code of a wireless device. Further, when a wireless device enters a low power mode or idle mode, the communication system can maintain the last known tracking area code of the wireless device. When data arrives for a wireless device which is in a low power mode or idle mode, a data notification can be sent to the access nodes in the last known tracking area of the wireless device.

Overview

In operation, a number of tracking area update messages received by a plurality of access nodes using a first tracking area configuration are monitored, and it is determined that a number of tracking area update messages received by one of the plurality of access nodes meets an update message criteria. It is also determined that a number of connected wireless devices at the one of the plurality of access nodes meets a connection criteria. When the number of tracking area update messages meets the update message criteria and when the number of connected wireless devices meets the connection criteria, the second tracking area configuration is used at the one access node.

DETAILED DESCRIPTION

Figure 1:
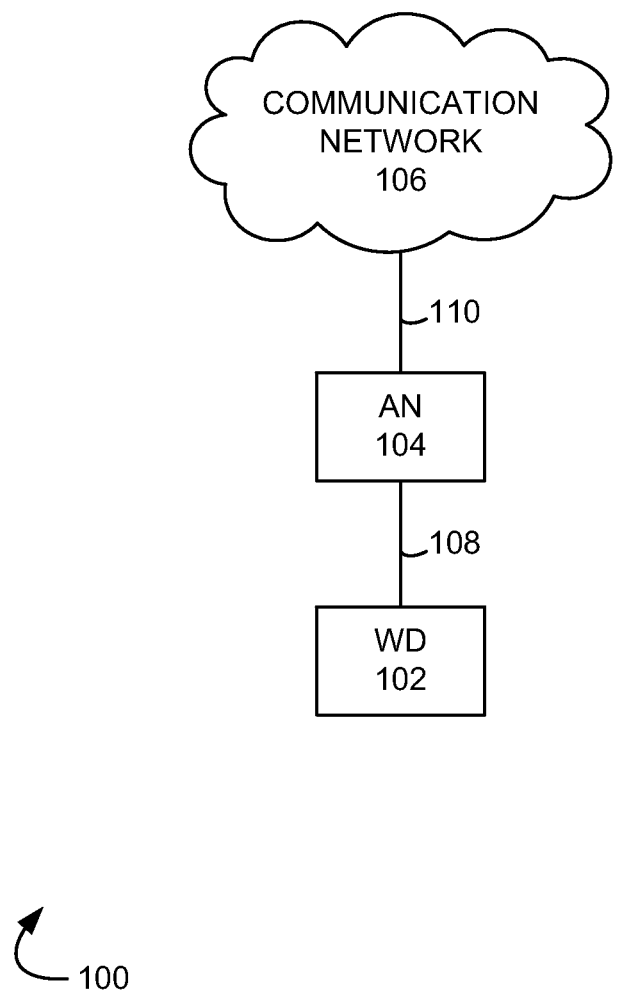
FIG. 1 illustrates an exemplary communication system for configuration of a tracking area.

FIG. 1 illustrates an exemplary communication system 100 for configuration of a tracking area comprising wireless device 102, access node 104 and communication system 106. Examples of wireless device 102 can comprise a cell phone, a smart phone, a computing platform such as a laptop, palmtop, or tablet, a personal digital assistant, or an internet access device, including combinations thereof. Wireless device 102 is in communication with access node 104 over communication link 108. Although a single wireless device 102 is illustrated in FIG. 1 for clarity, in operation, a plurality of wireless devices can communicate with access node 104.

Access node 104 is a network node capable of providing wireless communications to wireless device 102, and can be, for example, a base transceiver station, a radio base station, an eNodeB device, or an enhanced eNodeB device. Access node 104 is in communication with communication system 106 over communication link 110. Access node 104 can be part of a tracking area. A tracking area comprises a group of access nodes, and is typically identified by a tracking area code or similar tracking area identifier. Accordingly, while a single access node 104 is illustrated in FIG. 1, it will be understood that access node 104 can comprise a plurality of access nodes in a tracking area, each sharing a tracking area code or similar identifier of a tracking area. In operation, a plurality of wireless devices can communicate with one or more access nodes in a tracking area.

Further, wireless devices in communication with access node 104 can be in a low power or idle mode, or in an active communication mode or a connected mode. For example, wireless device 102 can be in active communication with access node 104, such as an RRC-connected mode or other similar communication mode. To preserve resources of communication link 108 and battery power of wireless device 102, wireless device 102 can also enter a low power or idle mode, in which wireless device 102 is not in active communication with access node 104. In operation, access node 104 can track a number of wireless devices in active communication with access node 104, and a number of wireless devices in idle mode.

Communication network 106 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 106 can be capable of carrying communication information, for example, to support communications by a wireless device such as wireless device 102. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 106 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 106 may also comprise base stations, controller nodes, telephony switches, internet routers, network gateways, computer systems, communication links, or some other type of communication equipment, and combinations thereof.

Communication links 108 and 110 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 100 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 104 and communication network 106 which are omitted for clarity, including additional processing nodes, routers, gateways, and physical and/or wireless data links for carrying data among the various network elements.

A location of a wireless device can be tracked by a communication network on the basis of a tracking area. A communication network can store a tracking area code of a wireless device. Further, when a wireless device enters a low power mode or idle mode, the communication network can maintain the last known tracking area code of the wireless device. When data arrives for a wireless device which is in idle mode, a data notification can be sent to the access nodes in the last known tracking area of the wireless device in a paging process or similar process.

A wireless device in idle mode can also move out of its last known tracking area into a new tracking area. When a wireless device changes tracking areas, the wireless device typically sends a tracking area update (TAU) message to notify the communication network. The wireless device can determine the new tracking area code from a message received from an access node. Where a wireless device is highly mobile, or where a wireless device is located near a border between two tracking areas, the wireless device may send multiple TAUs in a relatively short period of time as the wireless device changes tracking areas.

In operation, a number of tracking area update messages received by a plurality of access nodes using a first tracking area configuration are monitored, and it is determined that a number of tracking area update messages received by access node 102 meets an update message criteria. It is also determined that a number of connected wireless devices at access node 104 meets a connection criteria. When the number of tracking area update messages meets the update message criteria and when the number of connected wireless devices meets the connection criteria, the second tracking area configuration is used at access node 104.

Figure 2A:
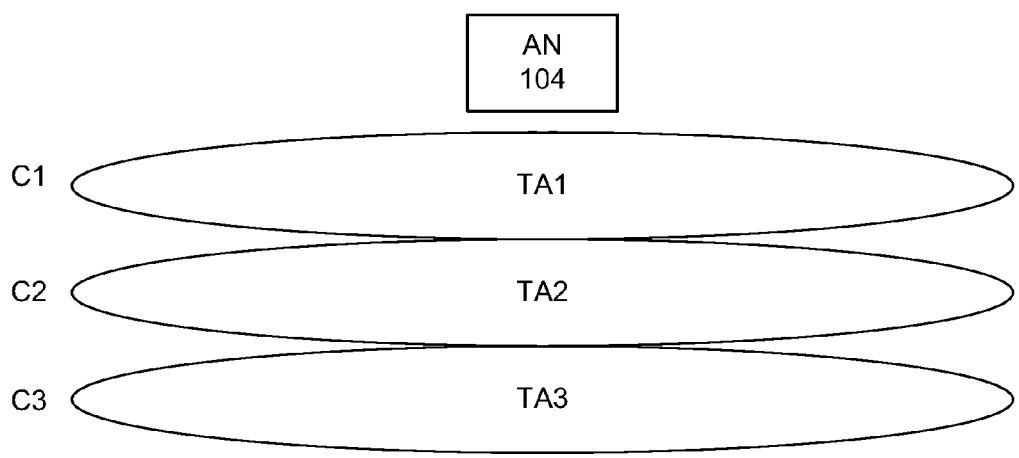
FIGS. 2A and 2B illustrate exemplary tracking area configurations.
Figure 2B:
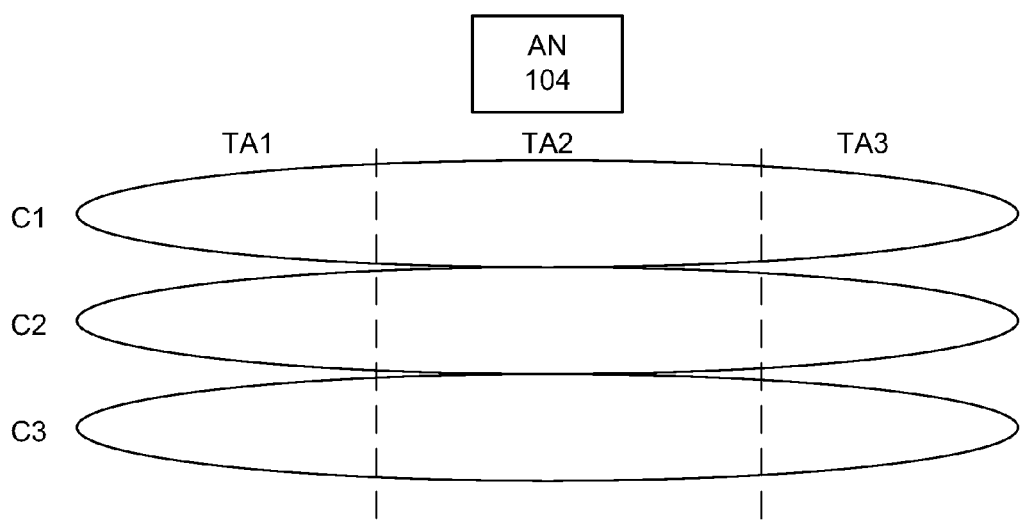

FIGS. 2A and 2B illustrate exemplary tracking area configurations. FIG. 2A illustrates a first tracking area configuration comprising access node 104 and three carrier bands C1, C2 and C3 which access node 104 can use for communication. Each carrier band corresponds with tracking area TA1, TA2 and TA3, respectively. The tracking areas illustrated in FIG. 2A are substantially geographically coextensive. When a wireless device changes operation from one carrier band to another, for example, from C1 to C2, the wireless device also changes tracking areas from TA1 to TA2, and the wireless device would typically send a TAU to access node 104 to notify the communication network of the change in tracking areas.

FIG. 2B illustrates a second tracking area configuration. In FIG. 2B, while coverage areas of carrier bands C1, C2 and C3 are substantially coextensive, tracking areas TA1, TA2 and TA3 are substantially bordering, and each of TA1, TA2 and TA3 comprises carrier bands C1, C2 and C3. Due to the nature of wireless communications, and/or according to network design, each of the tracking areas may overlap to some extent with a bordering tracking area, so that in operation the delineation between tracking areas TA1, TA2 and TA3 may not be as precise as illustrated in FIG. 2B. When a wireless device operating on one of carrier bands C1, C2 and C3 moves through the coverage area of access node 104, the wireless device also changes tracking areas among TA1, TA2 and TA3, and the wireless device would typically send a TAU to access node 104 to notify the communication network of the change in tracking areas.

Figure 3:
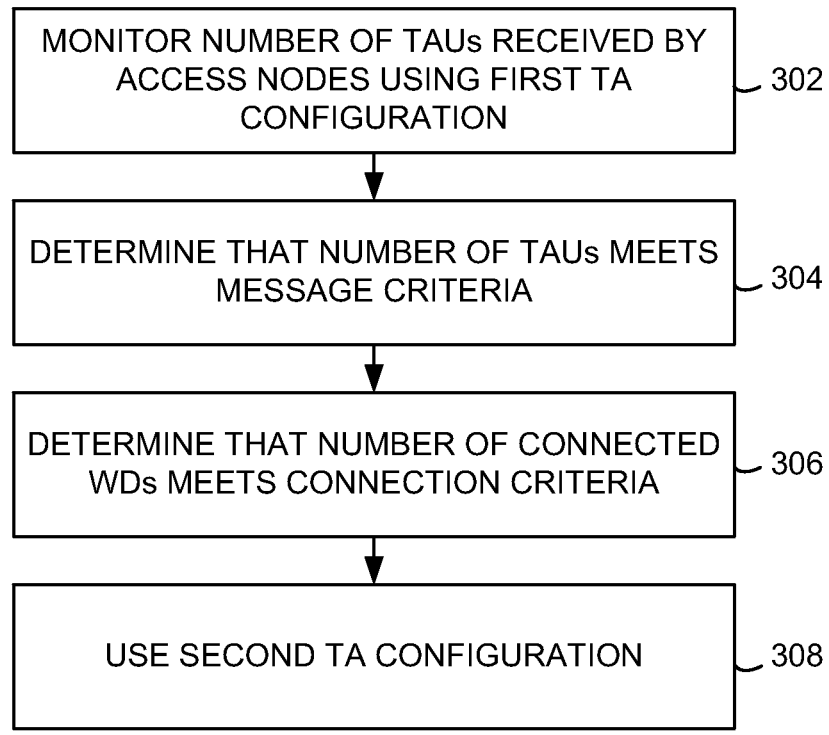
FIG. 3 illustrates an exemplary method of tracking area configuration.

FIG. 3 illustrates an exemplary method of tracking area configuration. In operation 302, a number of TAUs received by access nodes using a first tracking area configuration is monitored. For example, access node 104, which can be one of a plurality of access nodes in a tracking area, can receive a TAU from wireless device 102 when wireless device 102 changes from a tracking area to another tracking area. In an embodiment, wireless device 102 can change operation from a first carrier band to a second carrier band and can send a TAU to access node 104 to inform the communication network of the change in tracking areas.

In operation 304, it is determined that a number of tracking area update messages received by one of the plurality of access nodes meets an update message criteria. For example, it can be determined that a number of TAUs received by access node 104 meets an update message criteria. The update message criteria can comprise, for example, a number of TAUs in a period of time. In an embodiment, a number of TAU messages which meets the update message criteria can be correlated with a high loading of at least one access node.

In operation 306, it is determined that a number of connected wireless devices meets a connection criteria. For example, access node 104 can track a number of wireless devices in active communication with access node 104, and a number of wireless devices in idle mode. In an embodiment, access node 104 may be able to provide communications to a maximum number of wireless devices in idle mode and in connected mode. When the number of wireless devices in idle mode and in connected mode reaches the maximum number, access node 104 may reject other wireless devices which attempt to establish communication with access node 104, for example, for a handover to access node 104 (as when a wireless device is in active communication mode), or for cell reselection to access node 104 (as when a wireless device is in idle mode).

In operation 308, a second tracking area configuration is used at the one of the plurality of access nodes. For example, when the number of TAUs meets the update message criteria and when the number of connected wireless devices meets the connection criteria, access node 104 can be instructed to use a second tracking area configuration. As one example, when a number of TAUs meets the update message criteria and a number of connected wireless devices meets or exceeds a connection criteria, access node 104 can be instructed to change from a first tracking area configuration (such as illustrated in FIG. 2A) to a second tracking area configuration (such as illustrated in FIG. 2B). As another example, when a number of TAUs meets the update message criteria and a number of connected wireless devices meets or is less than a connection criteria, access node 104 can be instructed to change from a first tracking area configuration (such as illustrated in FIG. 2B) to a second tracking area configuration (such as illustrated in FIG. 2A).

Figure 4:
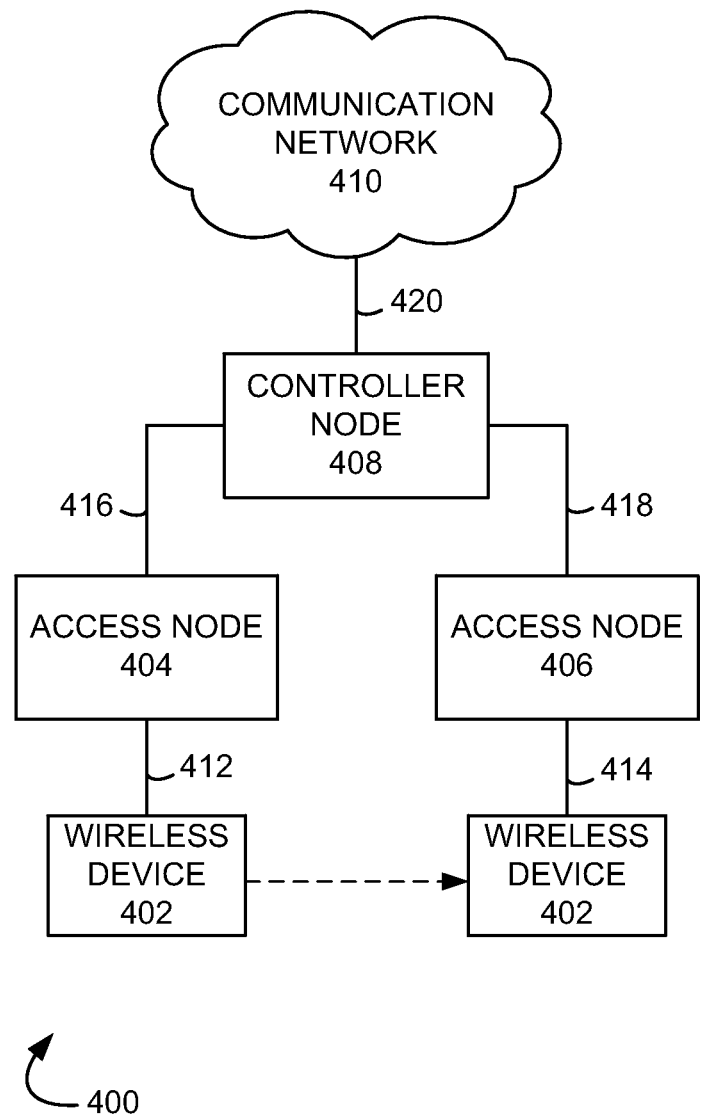
FIG. 4 illustrates another exemplary communication system for configuration of a tracking area.

FIG. 4 illustrates another exemplary communication system 400 for configuration of a tracking area comprising wireless device 402, access nodes 404 and 406, controller node 408, and communication network 410. Examples of wireless device 402 can comprise a cell phone, a smart phone, a computing platform such as a laptop, palmtop, or tablet, a personal digital assistant, or an internet access device, including combinations thereof. Wireless device 402 can communicate with access node 404 over communication link 412, and with access node 406 over communication link 414. Although a single wireless device 402 is illustrated in FIG. 4 for clarity, in operation, a plurality of wireless devices can communicate with access nodes 404 and 406.

Access nodes 404 and 406 are each a network node capable of providing wireless communications to wireless device 402, and can be, for example, a base transceiver station, a radio base station, an eNodeB device, or an enhanced eNodeB device. Access node 404 is in communication with controller node 408 over communication link 416, and access node 406 is in communication link with controller node 408 over communication link 418. Access nodes 404 and 406 may each have a coverage area for wireless communication, and further each access node coverage area may be divided into two or more areas, such as sectors or some other division of the coverage area. Access nodes 404 and 406 may communicate with each of its sectors independently from its other sectors, such as with a dedicated transceiver and/or other communication equipment.

Controller node 408 is a network element capable of, among other things, controlling tracking area configuration. Controller node 408 can comprise a processor and associated circuitry to execute or direct the execution of computer-readable instructions for sending a paging message. Controller node 408 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Controller node 408 can be for example, a standalone computing device or network element, such as a mobility management entity (MME), a call session control function (CSCF), a gateway, a proxy node, or another network element. The functionality of controller node 408 can be included in a network element capable of multiple functions, and can also be distributed across two or more network elements. Controller node 408 is in communication with communication network 410 over communication link 420.

Communication network 410 can be wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 410 may also comprise a wireless network, including base stations, wireless communication nodes, telephony switches, internet routers, network gateways, computer systems, communication links, or some other type of communication equipment, and combinations thereof. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 302 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 410 may also comprise base stations, wireless communication nodes, telephony switches, internet routers, network gateways, computer systems, communication links, or some other type of communication equipment, and combinations thereof.

Communication links 412, 414, 416, 418 and 420 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in the communication system 400 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access nodes 404 and 406, controller node 408, and communication network 410 which are omitted for clarity, including additional processing nodes, routers, gateways, and physical and/or wireless data links for carrying data among the various network elements.

Figure 5:
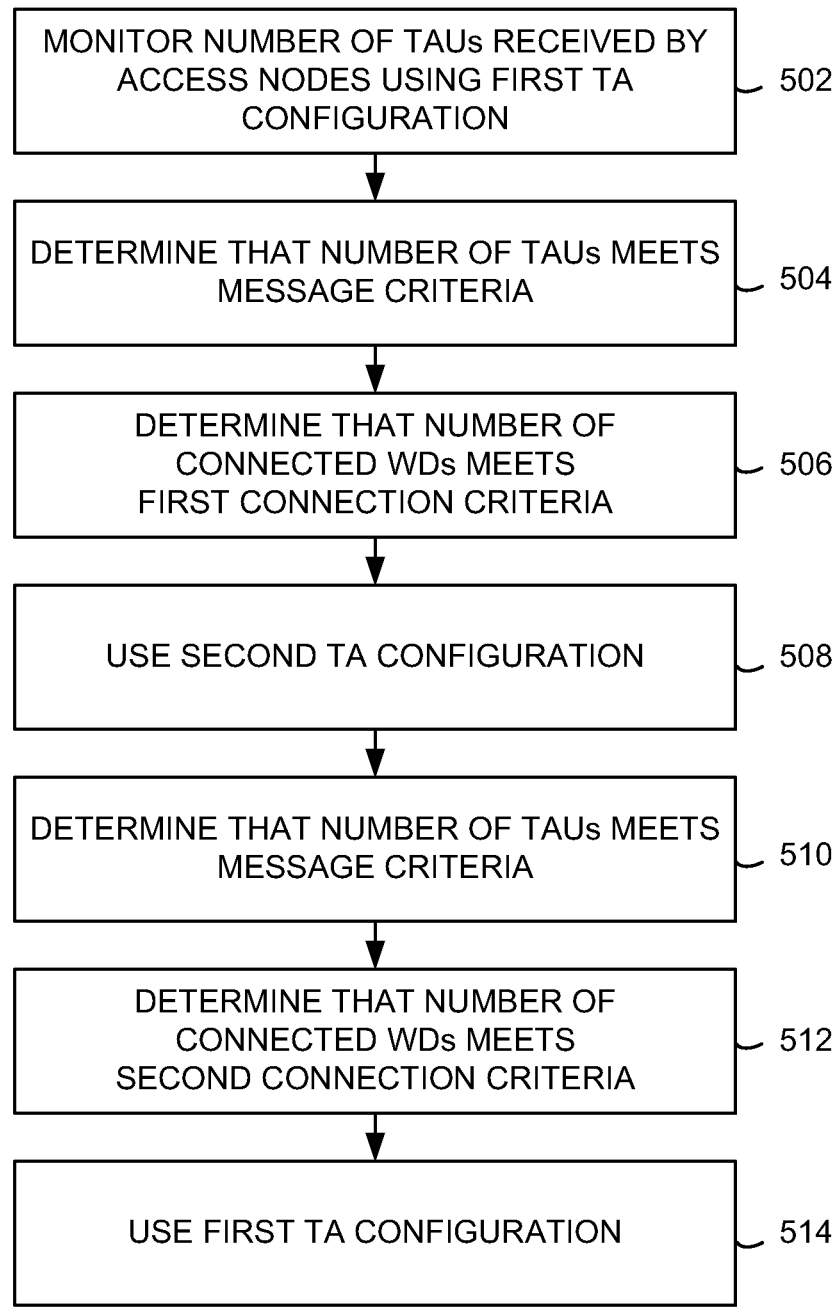
FIG. 5 illustrates another exemplary method of tracking area configuration.

FIG. 5 illustrates another exemplary method of tracking area configuration. In operation 502, a number of TAUs received by access nodes using a first tracking area configuration is monitored. For example, access node 406 can receive a TAU from wireless device 402 when wireless device 402 changes from communicating with access node 404 to communicating with access node 406. In an embodiment, wireless device 102 can change operation from a first carrier band to a second carrier band and can send a TAU to access node 406 to inform controller node 408 of the change in tracking areas. In an embodiment, wireless device 402 can communicate with access nodes 404 and 406 using the same or substantially similar carrier band, and each of access nodes 404 and 406 can be associated with a different tracking area.

In operation 504, it is determined that a number of tracking area update messages received by one of the plurality of access nodes meets an update message criteria. For example, it can be determined that a number of TAUs received by access node 406 meets an update message criteria. The update message criteria can comprise, for example, a number of TAUs in a period of time. In an embodiment, a number of TAU messages which meets the update message criteria can be correlated with a high loading of at least one access node.

In operation 506, it is determined that a number of connected wireless devices meets a first connection criteria. For example, access node 406, or controller node 408, can track a number of wireless devices in active communication with access node 406, and a number of wireless devices in idle mode. In an embodiment, access node 406 may be able to provide communications to a maximum number of wireless devices in idle mode and in connected mode. When the number of wireless devices in idle mode and in connected mode reaches the maximum number, access node may reject other wireless devices which attempt to establish communication with access node 406, for example, by a handover to access node 406 from access node 404 (as when a wireless device is in active communication mode), or by cell reselection to access node 406 from access node 404 (as when a wireless device is in idle mode). As one example, when a number of TAUs meets the update message criteria and a number of connected wireless devices meets or exceeds the first connection criteria, access node 406 can be instructed to change from a first tracking area configuration (such as illustrated in FIG. 2A) to a second tracking area configuration (such as illustrated in FIG. 2B).

In an embodiment, a first counter can be used to count the wireless devices in an active communication state or an active communication session, and a second counter can be used to count the wireless devices in an idle state. In an embodiment, counters can be used for different carrier bands of an access node, such that a first counter counts the number of wireless devices with an active communication session in a first carrier band of the access node, a second counter counts the number of wireless devices in a low power state in the first carrier band of the access node, a third counter counts the number of wireless devices with an active communication session in a second carrier band of the access node, and a fourth counter counts the number of wireless devices in a low power state in the second carrier band of the access node.

In operation 508, a second tracking area configuration is used at an access node. For example, when the number of TAUs meets the update message criteria and when the number of connected wireless devices meets the connection criteria, access node 406 can be instructed to use a second tracking area configuration. As one example, when a number of TAUs meets the update message criteria and a number of connected wireless devices meets or exceeds a connection criteria, access node 406 can be instructed to change from a first tracking area configuration (such as illustrated in FIG. 2A) to a second tracking area configuration (such as illustrated in FIG. 2B).

In operation 510, it is again determined that a number of tracking area update messages received by one of the plurality of access nodes meets an update message criteria. For example, at access node 406 it can be determined that a number of TAUs received by access node 406 meets an update message criteria. The update message criteria can comprise, for example, a number of TAUs in a period of time.

In operation 512, it is determined that a number of connected wireless devices meets a second connection criteria. For example, access node 406, or controller node 408, can track a number of wireless devices in active communication with access node 406, and a number of wireless devices in idle mode. The second connection criteria can comprise a number of wireless devices in a connected mode which is lower than the first connection criteria. As an example, when a number of TAUs meets the update message criteria and a number of connected wireless devices meets or is less than the connection criteria, access node 406 can be instructed to change from a first tracking area configuration (such as illustrated in FIG. 2B) to a second tracking area configuration (such as illustrated in FIG. 2A). The instruction can be generated by access node 406, or it can be generated by another network element such as controller node 408.

In operation 514, the first tracking area configuration is used at an access node. For example, when the number of TAUs meets the update message criteria and when the number of connected wireless devices meets the connection criteria, access node 406 can be instructed to use the first tracking area configuration. In an embodiment, the number of TAUs received at access node 406 when access node 406 is using the second tracking area configuration can be correlated with high mobility of wireless devices in communication with access node 406. When a number of TAUs meets the update message criteria and a number of connected wireless devices meets or is less than a connection criteria, access node 406 can be instructed to change from a first tracking area configuration (such as illustrated in FIG. 2B) to a second tracking area configuration (such as illustrated in FIG. 2A).

In an embodiment, time periods can be determined related to the numbers of wireless devices and the operating modes of the wireless devices. For example, a first time period can be determined during which the number of connected wireless devices at one or more an access node meets the first connection threshold, As another example, a second time period during which the number of connected wireless devices at the one of the plurality of access nodes meets the second connection threshold. When the first and second time periods have been determined, the first tracking area configuration can be used during the first time period and the second tracking area configuration can be used during the second time period. For example, the first and second time periods can be time periods during the day. In an embodiment, the first time period can correspond to a determined time of high wireless device mobility, such as a time when commuting is likely to occur, and the second time period can correspond to a determined time of lower wireless mobility, such as during the work day, or at night. Time periods can correspond to days of the week, or to certain months, seasons, or to other time periods.

As described above, a tracking area configuration may comprise a plurality of substantially bordering tracking areas (for example, as illustrated in FIG. 2B). In an embodiment, each tracking area can comprise a sector of the access node. For example, a coverage area of access node 104, or access node 406, can be divided into two or more sectors, and each of the sectors can be associated with a different tracking area. Tracking wireless devices by sector would enable highly granular control over network resources used to notify wireless devices of incoming data or communication session requests.

In an embodiment, the tracking area configuration each sector of an access node can comprise a plurality of tracking areas. For example, as described above, a tracking area configuration may comprise a plurality of substantially coextensive tracking areas (for example, as illustrated in FIG. 2A). Where the coverage area of an access node is divided into two or more sectors, each sector can be capable of supporting communication in a plurality of carrier bands. Further each carrier band can be associated with a different tracking area. Thus, in an embodiment, the tracking area configuration each sector of an access node can comprise a plurality of tracking areas.

Figure 6:
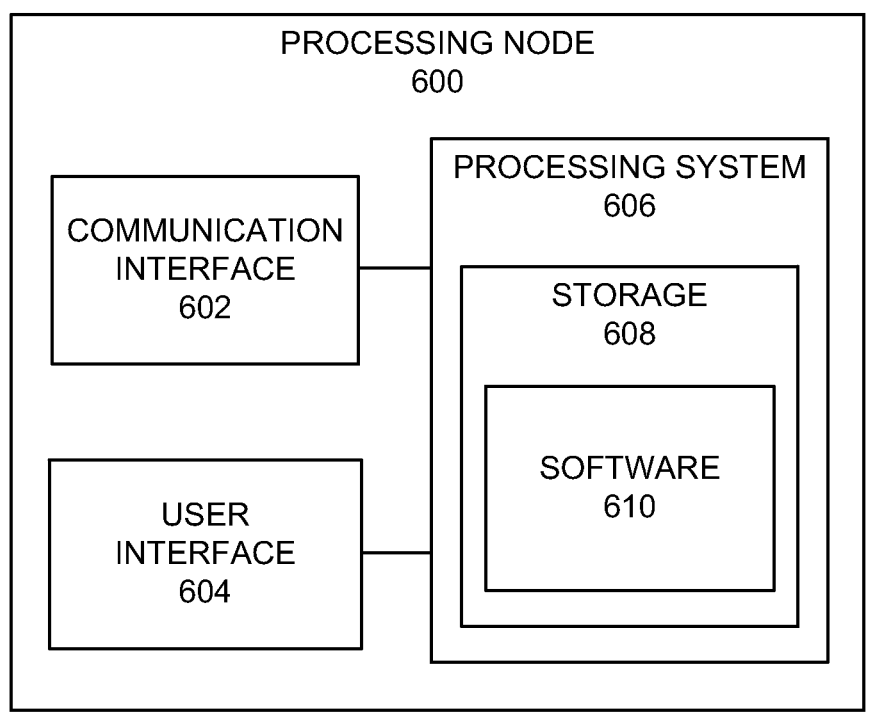
FIG. 6 illustrates an exemplary processing node.

FIG. 6 illustrates an exemplary processing node 600 in a communication system. Processing node 600 comprises communication interface 602, user interface 604, and processing system 606 in communication with communication interface 602 and user interface 604. Processing node 600 is capable of methods of tracking area configuration. Processing system 606 includes storage 608, which can comprise a disk drive, flash drive, memory circuitry, or other memory device. Storage 608 can store software 610 which is used in the operation of the processing node 600. Storage 608 may include a disk drive, flash drive, data storage circuitry, or some other memory apparatus. Software 610 may include computer programs, firmware, or some other form of machine-readable instructions, including an operating system, utilities, drivers, network interfaces, applications, or some other type of software. Processing system 606 may include a microprocessor and other circuitry to retrieve and execute software 610 from storage 608. Processing node 600 may further include other components such as a power management unit, a control interface unit, etc., which are omitted for clarity. Communication interface 602 permits processing node 600 to communicate with other network elements. User interface 604 permits the configuration and control of the operation of processing node 600.

An examples of processing node 600 includes controller node 408. Processing node can also be an adjunct or component of a network element, such as an element of access node 104, access node 404 or access node 406. Processing node 600 can also be another network element in a communication system. The functionality of processing node 600 can also be distributed over two or more network elements.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of tracking area configuration, comprising:
    monitoring a number of tracking area update messages received by a plurality of access nodes using a first tracking area configuration;
    determining that a number of tracking area update messages received by one of the plurality of access nodes meets an update message criteria;
    determining that a number of connected wireless devices at the one of the plurality of access nodes meets a connection criteria; and
    using a second tracking area configuration at the one of the plurality of access nodes when the number of tracking area update messages meets the update message criteria and when the number of connected wireless devices meets the connection criteria.

2. The method of claim 1, further comprising:
    determining that the number of connected wireless devices at the one of the plurality of access nodes meets a second connection criteria; and
    using the first tracking area configuration at the one of the plurality of access nodes.

3. The method of claim 2, further comprising:
    determining a first time period during which the number of connected wireless devices at the one of the plurality of access nodes meets the connection threshold;
    determining a second time period during which the number of connected wireless devices at the one of the plurality of access nodes meets the second connection threshold; and
    using at the one of the plurality of access nodes the first tracking area configuration during the first time period and the second tracking area configuration during the second time period.

4. The method of claim 1, wherein the first tracking area configuration comprises a plurality of substantially coextensive tracking areas.

5. The method of claim 4, wherein each tracking area comprises a single carrier, and a tracking area update message is received when a wireless device moves from one of the plurality of tracking areas to another of plurality of tracking areas.

6. The method of claim 1, wherein the second tracking area configuration comprises a plurality of substantially bordering tracking areas.

7. The method of claim 6, wherein each tracking area comprises a plurality of carriers, and a tracking area update message is received when a wireless device moves from one of the plurality of tracking areas to another of the plurality of tracking areas.

8. The method of claim 6, wherein in the second tracking area configuration each tracking area comprises a sector of the one of the plurality of access nodes.

9. The method of claim 6, wherein in the second tracking area configuration each sector of the one of the plurality of access nodes comprises a plurality of tracking areas.

10. The method of claim 1, wherein the number of connected wireless devices comprises a number of wireless devices with an active communication session and a number of wireless devices in a low power state.

11. The method of claim 10, wherein a first counter counts the number of wireless devices with an active communication session, and a second counter counts the number of wireless devices in a low power state.

12. The method of claim 10, wherein a first counter counts the number of wireless devices with an active communication session in a first carrier band of an access node, a second counter counts the number of wireless devices in a low power state in the first carrier band of the access node, a third counter counts the number of wireless devices with an active communication session in a second carrier band of the access node, and a fourth counter counts the number of wireless devices in a low power state in the second carrier band of the access node.

13. A system for tracking area configuration, comprising:
    a processing node configured to
        monitor a number of tracking area update messages received by a plurality of access nodes using a first tracking area configuration;
        determine that a number of tracking area update messages received by one of the plurality of access nodes meets an update message criteria;
        determine that a number of connected wireless devices at the one of the plurality of access nodes meets a connection criteria; and
        instruct the use of a second tracking area configuration at the one of the plurality of access nodes when the number of tracking area update messages meets the update message criteria and when the number of connected wireless devices meets the connection criteria.

14. The system of claim 13, wherein the processing node is further configured to:
    determine that the number of connected wireless devices at the one of the plurality of access nodes meets a second connection criteria; and
    instruct the use of the first tracking area configuration at the one of the plurality of access nodes.

15. The system of claim 14, wherein the processing node is further configured to:
    determine a first time period during which the number of connected wireless devices at the one of the plurality of access nodes meets the connection threshold;
    determine a second time period during which the number of connected wireless devices at the one of the plurality of access nodes meets the second connection threshold; and instruct the use the first tracking area configuration at the one of the plurality of access nodes during the first time period and the use of the second tracking area configuration during the second time period.

16. The method of claim 13, wherein the first tracking area configuration comprises a plurality of substantially coextensive tracking areas.

17. The method of claim 16, wherein each tracking area comprises a single carrier, and a tracking area update message is received when a wireless device moves from one of the plurality of tracking areas to another of plurality of tracking areas.

18. The method of claim 13, wherein the second tracking area configuration comprises a plurality of substantially bordering tracking areas.

19. The method of claim 18, wherein in the second tracking area configuration each tracking area comprises a sector of the one of the plurality of access nodes, and each sector further comprises a plurality of carriers, wherein a tracking area update message is received when a wireless device moves from one of the plurality of tracking areas to another of the plurality of tracking areas.

20. The method of claim 18, wherein in the second tracking area configuration each sector of the one of the plurality of access nodes comprises a plurality of tracking areas, and each sector further comprises a plurality of carriers, wherein, wherein a tracking area update message is received when a wireless device moves from one of the plurality of tracking areas to another of the plurality of tracking areas.

* * * * *